R. TAMPIER.
CONTROL MECHANISM FOR AEROPLANES.
APPLICATION FILED NOV. 2, 1910.
1,084,829.
Patented Jan. 20, 1914.
3 SHEETS—SHEET 1.
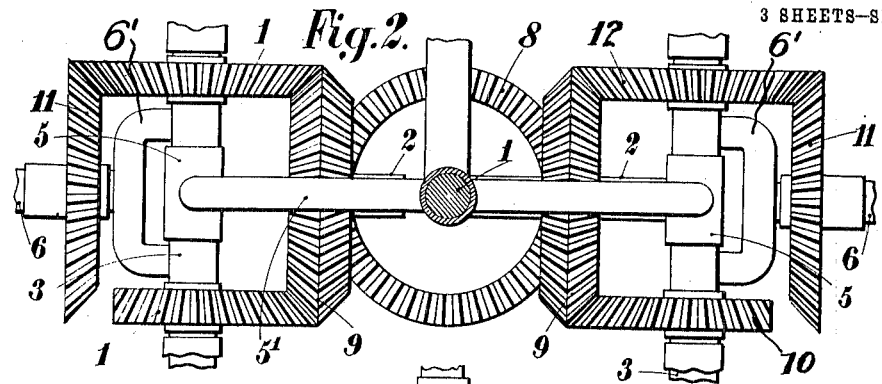
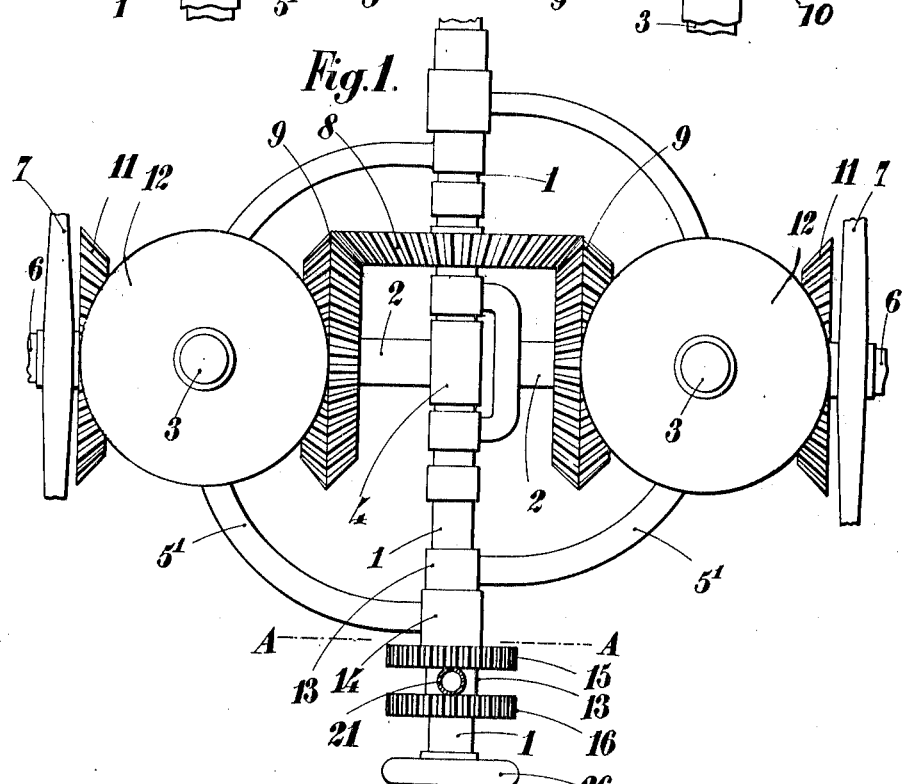
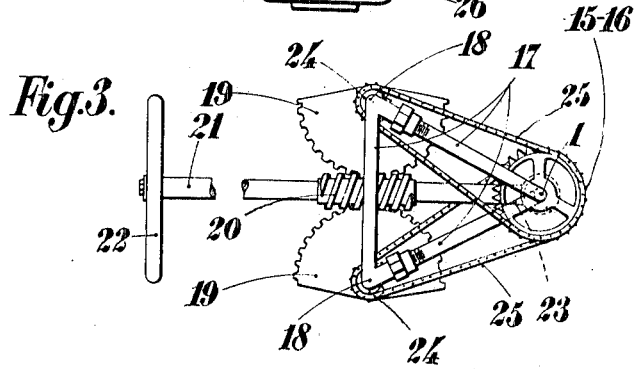
Witnesses:
E. C. Schuermann
Inventor:
René Tampier
by
Attys R. TAMPIER.
CONTROL MECHANISM FOR AEROPLANES.
APPLICATION FILED NOV. 2, 1910.
1,084,829.
Patented Jan. 20, 1914.
3 SHEETS—SHEET 2.
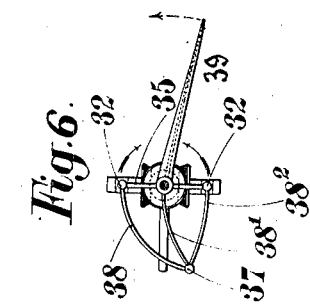
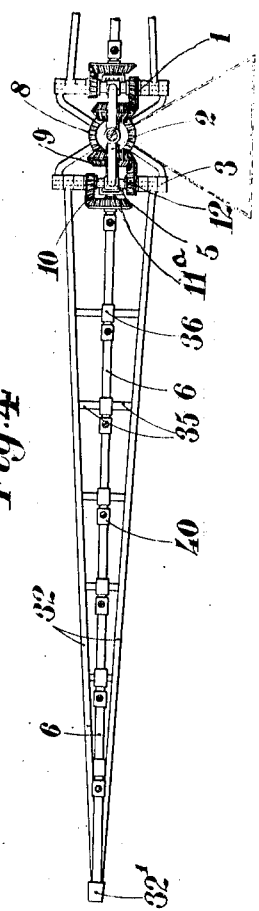
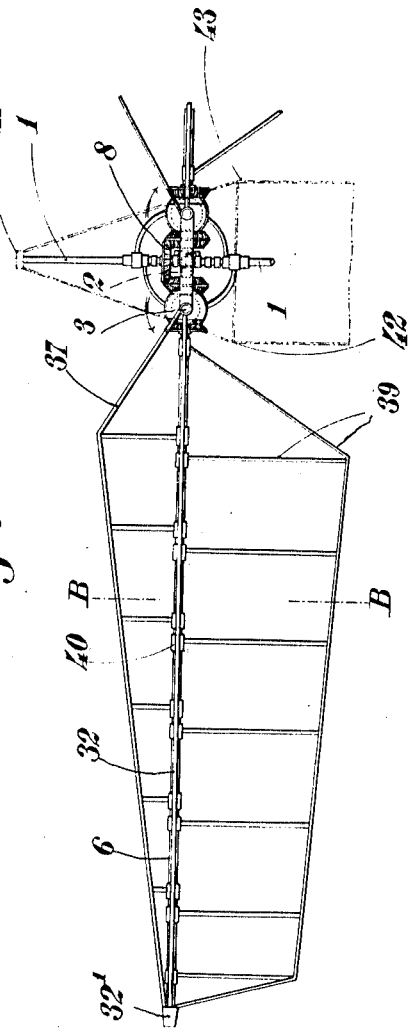
Witnesses.
E. C. Schuermann
J. W. Starr
Inventor.
René Tampier
by Pennie Goldsborough O'Neill
Attys.

R. TAMPIER.
CONTROL MECHANISM FOR AEROPLANES.
APPLICATION FILED NOV. 2, 1910.
1,084,829.
Patented Jan. 20, 1914.
3 SHEETS—SHEET 3.
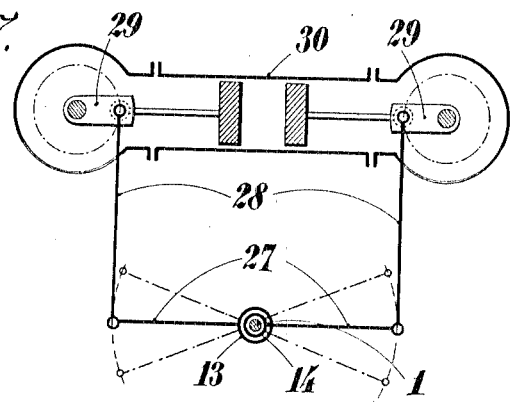
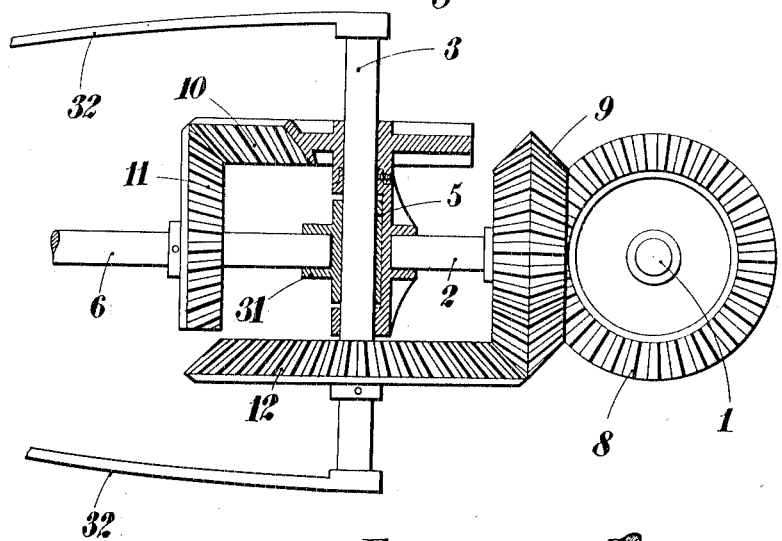
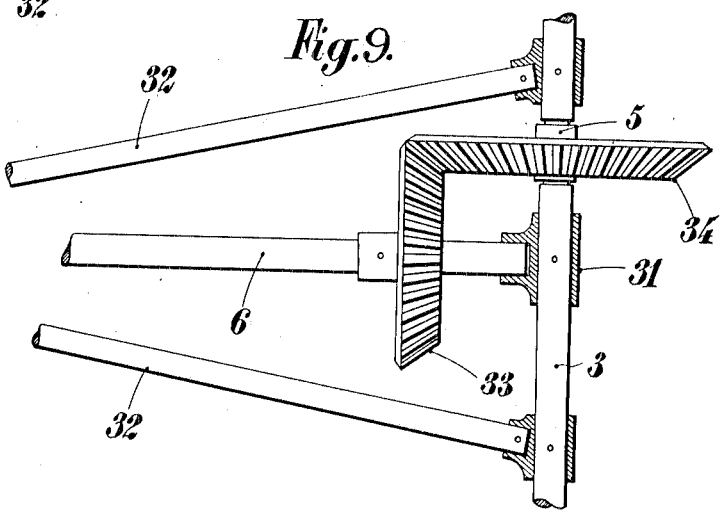

UNITED STATES PATENT OFFICE.

RENÉ TAMPIER, OF PARIS, FRANCE.

CONTROL MECHANISM FOR AEROPLANES.

1,084,829. Specification of Letters Patent. Patented Jan. 20, 1914.

Application filed November 2, 1910. Serial No. 590,316.

*To all whom it may concern:*

Be it known that I, RENÉ TAMPIER, citizen of the French Republic, residing at Paris, Department of the Seine, in France, have invented certain new and useful Improvements in Control Mechanism for Aeroplanes; and I do hereby declare the following to be a full, clear, and exact description of the invention, such as will enable others skilled in the art to which it appertains to make and use the same.

The invention has for its object a mechanical device capable of giving a shaft any direction in space by the intermediary of a system of three perpendicularly arranged shafts connected one with the other by suitably arranged and controlled transmissions such as toothed wheels for example. For instance, the shafts to be directed might be those serving as supports for the supporting, controlling or propelling surfaces of aeroplanes so that these surfaces can be given all the movements necessary for steering, modifying the speed and reducing the size of the machine in case of rolling on roads.

In the accompanying drawing: Figure 1 is a plan view of the mechanism forming the object of the invention. Fig. 2 is a section on the line A—A in Fig. 1. Fig. 3 is a view drawn to a smaller scale of the controlling device. Fig. 4 is a fragmentary, vertical, transverse section through an aeroplane embodying my improved mechanism;
Fig. 5 is a top plan view of a portion of the aeroplane; Fig. 6 is a vertical transverse section through the wing or plane, taken on the line B—B of Fig. 5. Fig. 7 represents the application of the improved mechanism for obtaining a wing movement. Figs. 8 and 9 represent constructional modifications.

The apparatus comprises broadly three shafts 1, 2, 3 (Figs. 1 to 3) arranged perpendicularly one to the other and connected one with the other in the following manner: The main shaft 1 which serves as a support for the apparatus as a whole is fixed to the frame in any suitable manner; the duplex apparatus shown is symmetrical relatively to this shaft 1. At one of its ends the shaft 2 is rigidly connected with a sleeve 4 capable of rotation upon the shaft 1 and carries at its other end a sleeve 5 in which the intermediate shaft 3 rotates. The sleeve 5 is supported by a cradle 5' resting by means of sleeves on the shaft 1. A shaft 6 rigidly connected with the shaft 3 by means of a fork 6' which is keyed to the shaft 3 supports the framework 7 of the wing or plane. A bevel wheel 8 is fixed to the shaft 1 and meshes with a double bevel wheel 9 mounted freely on the shaft 2; this wheel 9 also meshes with a bevel wheel segment 10 keyed upon the shaft 3. A wheel with bevel teeth 11 mounted freely on the shaft 6 meshes with a wheel 12 with bevel teeth mounted freely on the shaft 3 which itself meshes with the wheel 9. The two cradles 5' rest upon the shaft 1 by the intermediary of concentrically mounted sleeves 13—14.
The toothed wheels 15 and 16 are fixed respectively to sleeves 13 and 14.

A triangular frame formed of tubes 17 for example is supported at one of its apexes by the shaft 1 and at its other angles carries two spindles 18 upon which there are secured toothed sectors 19 meshing with a worm 20 carried by a rod 21 controlled by a hand wheel 22. The rod 21 is able to pivot in a tube rigid with a supporting collar 23 loose upon the shaft 1. Pinions 24 are keyed upon the spindles 18 and connected by means of chains 25 with the toothed wheels 15 and 16.

The transmission by means of chains has been given by way of example only.

The shaft 6 supporting the supporting or controlling surfaces can be moved in any direction by rotating the hand wheel 22. In the initial position the shafts 2 are in line. If the hand wheel be rotated the screw 20 displaces the sectors 19 and the pinions 24 in opposite directions. The toothed wheels 15 and 16 will also be displaced in opposite directions and displace the cradles 5'; the wheels 9 mounted freely on the shafts 2 rotate upon the wheel 8 and according to the angle through which the hand wheel 22 has been rotated the shafts 2 will assume a more or less obtuse angle in the upward direction, for example. The wheels 9 in turning rotate the shafts 3 by the intermediary of the wheels 10 rigid with these shafts. The result of this movement will be to bring the supporting surfaces forward. Consequently owing to the rotation imparted to the hand wheel 22 the shafts 6 will have been displaced upward and forward and the center of pressure of the supporting or controlling surfaces displaced upward and forward. Inversely, the center of pressure might be displaced downward and rearward by operating the hand wheel in the opposite direction. The wheel 9 meshing with the wheel 12 mounted freely on the shaft 3 produces the rotation of the wheel 11 loose upon the shaft 6; if the sleeve carrying the wheel 11 is connected by means of guy ropes, for example, with certain parts of the supporting surface the rotation of the wheel 11 also permits of imparting a movement of rotation to the supporting surface or a part thereof. The ratios between the teeth of the wheels 8, 9, 10 and 11 will afford all combinations of movement. The shaft 21 can also be swung pivotally, without rotation, in such a manner as to include the controlling mechanism as a whole which comprises the frame 17 and the transmissions. In this case the toothed wheels 15 and 16 and the cradles 5' supporting the shafts 2 are displaced simultaneously and in the same direction; one of the shafts 2 ascends and the other descends and the supporting or controlling surfaces will be displaced as regards one of them upward and forward and as regards the other downward and rearward, thereby enabling equilibrium of the apparatus to be established in air currents or eddies. The shaft 21 can also be operated in such a manner as to incline it at the same time that it is rotated. From what has been stated it is obvious that the effects will be cumulative for one of the wings and in opposition as regards the other. According to the amplitude of the rotation and of the inclination this differential action may proceed so far as to lock one of the wings while the other moves.

A supplementary hand wheel 26 may also be provided for enabling the shaft 1 to be rotated in its supports by means of suitable transmission gear. In this case the shaft 2 will remain motionless and the wheel 8 owing to the rotation imparted to the shaft 1 will rotate the wheels 9 and consequently the shaft 3 and the wheel 11.

Figs. 4 to 6 inclusive show an aeroplane embodying controlling mechanism substantially similar to that shown in Figs. 1 to 3 inclusive. The apparatus of Figs. 4 to 6 differ from that of Figs. 1 to 3 only in a few slight particulars, and therefore the operation of the apparatus previously described will probably be more easily understandable in connection with the mechanism now to be described. In Figs. 4 and 5, the main supporting shaft 1 is shown as placed horizontally between the wings of the aeroplane at the front of the machine. The arrangement of the shafts 1, 2, and 3 is the same as that previously described, but the beveled pinion 11$^a$ instead of being keyed to a sleeve loose on the shaft 6, is keyed directly to said shaft to rotate the same. The outer end of the wing supporting shaft 6 is mounted in a bearing 32' formed at the connection of the rods 32 which are keyed or otherwise rigidly secured to the shaft 3. The rods 32 are connected by means of cross rods 35 having sleeves 36 forming intermediate bearings for the shaft 6. In this manner, the rods 32 and cross rods 35 form a triangular frame carried by the shaft 3 and in which the shaft 6 is journaled for rocking movement. The triangular frame forms the median part of the wing, and the front edge of the wing is defined by a rod 37 connected to the rods 32 and to the sleeves 36 by means of arms 38, 38' and 38$^2$. The rear part of the wing is constituted by a frame 39 having sleeves 40 secured to the shaft 6 in order that the rear wing frame will partake of the rocking movement of said shaft. The wing is covered by linen or the like stretched over the arms 38, 38$^2$ at the front of the wing, and over the flat frame constituting the rear part of the wing. It will be evident from Fig. 6 that the completed wing will thus have a thick front edge, which is stationary, and an upwardly and downwardly movable rear surface formed by the frame 39. The driving mechanism is not shown in Figs. 4 to 6 but it will be understood that when the driving wheel is rotated by the aviator the shafts 2 are moved downward, for instance, the pinions 9 rolling on the relatively fixed pinion 8. In this manner as both wings are moved downward simultaneously the shafts 3 are rotated in the direction of the arrows (Fig. 5) so that the rods 32 of the wings are actuated to swing said wings backward against the fuselage. At the same time, the engagement of the toothed segment 10 with the bevel wheel 11$^a$ will obviously produce a rocking movement of the shaft 6 which will swing the rear portion 39 of the wing into the desired position against or adjacent the fuselage. It is obvious that the form of the wing may be different from that just described provided that it receive two separate movements for varying the incidence angle and the inclination of the median of the wing with respect to the longitudinal axis of the aeroplane.

Now assuming that the collars 13 and 14 of the cradles (Fig. 1) carry respectively cranks 27 which are connected by means of rods 28 with the cranks 29 of a motor 30 with opposed cylinders (see Fig. 7) the motor will impart an alternating movement to the cranks 27 so that a wing movement will be given to the surfaces carried by the shafts 6. It should be understood that an alternating movement can be given to the cranks 27 by employing any suitable type of motor and transmission.

The device which forms the object of the invention is not limited to the control of the wings of an aeroplane but is applicable generally to the control of a moving part moving in a fluid of any kind.

Constructional modifications of the controlling device are shown in Figs. 8 and 9. In Fig. 8 the shaft 3 forms part of the system of three perpendicular shafts described above. The segment of a toothed wheel 10 instead of participating integrally in the rotation of the spindle 3 is fixed upon the socket 5. The segment 10 does not mesh with the wheel 9 but with the toothed wheel segment 11 keyed upon the shaft 6. The toothed wheel 12 which meshes with the wheel 9 is keyed upon the shaft 3. The shaft 6 is supported on the one hand by a sleeve 31 in which it is able to rotate, and on the other hand, by arms 32 rigid with the shaft 3. In this case when the operating hand wheel 22 is acted upon in the proper direction the shaft 2 moves upward for example while the wheel 9 in turning upon the fixed wheel 8 rotates the toothed wheel 12 and the shaft 3 rigidly connected therewith. By the intermediary of the arms 32 the shaft 3 moves the shaft 6 forward or rearward in a plane perpendicular to the shaft 3. The toothed wheel 11 in running on the fixed wheel 10 during the displacement of the shaft 6 causes the latter to rotate upon itself. Accordingly this device also produces a displacement of the shaft 6 in three directions: upward or downward, forward or rearward and rotation of this shaft upon itself. This control device can be simplified in cases where it is desired to impart to the shafts 3 movements in two directions only. Fig. 9 shows a special constructional form of the device enabling the wings of an aeroplane to be turned back toward the front or toward the rear.

A shaft 3 independent of the system of perpendicular spindles and supported in any convenient manner by the fuselage is mounted in a sleeve 5 carried on a fixed part of the apparatus. A suitable controlling device enables the shaft 3 to be rotated in its supports and in the sleeve 5. The shaft 6 is mounted so that it can turn in a sleeve 31 which can be keyed to the shaft 3; the fixed sleeve 5 carries a bevel pinion 34 which meshes with a bevel pinion 33 keyed on the shaft 6. Arms 32 rigid with the shaft 3 serve to support the end of the shaft 6.

The device operates as follows: The shaft 3 is rotated in the appropriate direction by operating its controlling device. The shaft 6, rendered rigid with the shaft 3 by the arms 32 or merely by the keying of the sleeve 31 to the shaft 3 but which is able to rotate in said sleeve, is then displaced in a plane perpendicular to the shaft 3. The pinion 33 keyed upon the shaft 6 runs upon the fixed pinion 34 and causes this shaft to rotate upon itself. Consequently when the shaft 3 is operated the shaft 6 is displaced toward the front or toward the rear while it rotates upon itself in the appropriate direction. When the control device is fitted to an aeroplane this combination of movements permits of turning the wings rearward in bringing them against the fuselage; it likewise permits, owing to the movements obtained, of producing variations of speed and of reëstablishing equilibrium.

Claims:

1. In controlling mechanism such as described, the combination of a shaft mounted to swing about two perpendicularly arranged pivots, a rocking element associated with said shaft, and gearing adapted to actuate said rocking element and simultaneously swing said shaft with respect to both of said pivots.

2. In controlling mechanism such as described, the combination of a shaft mounted to swing about two perpendicularly arranged pivots, a rocking element associated with said shaft, gearing adapted to actuate said rocking element and simultaneously swing said shaft with respect to both of said pivots, and means to actuate said gearing.

3. In controlling mechanism such as described, the combination of a wing shaft mounted to swing about two perpendicularly disposed axes, gearing associated with the shaft to change the incidence of the wing, and gearing to swing said shaft with respect to both of said axes and to simultaneously actuate said incidence changing gearing.

4. In controlling mechanism for aeroplanes and the like, the combination of a main shaft, an intermediate shaft arranged at right angles thereto and spaced from said main shaft, means to swing said intermediate shaft longitudinally of itself around said main shaft as a center, a third shaft arranged at right angles to the intermediate shaft, and gearing whereby the swinging of the intermediate shaft actuates the last-named shaft about said intermediate shaft.

5. In controlling mechanism such as described, the combination of a main shaft, an intermediate shaft arranged at right angles thereto and spaced from said main shaft and adapted to swing longitudinally of itself in an upward and downward direction around said main shaft as a center, a third shaft mounted at right angles to the intermediate shaft and adapted to swing in a backward and forward direction around said intermediate shaft, controlling means associated with the main shaft adapted to swing said intermediate shaft around the main shaft, and gearing adapted to actuate the third shaft when said controlling means is operated to swing the intermediate shaft around the main shaft.

6. In controlling mechanism such as described, the combination of a rock shaft mounted to swing about two perpendicularly arranged pivots, means comprising an actuating member the rotation of which operates said means to rock said shaft and simultaneously swing the same with respect to both of said pivots.

7. In controlling mechanism such as described, the combination of a shaft mounted to swing about two perpendicularly arranged pivots, a rocking element associated with said shaft, rotary connections adapted to swing said shaft with respect to both of said pivots, and rotary connections whereby said rocking element is actuated by the swinging of said shaft.

In testimony whereof I affix my signature, in presence of two witnesses.

RENÉ TAMPIER.

Witnesses:
   H. C. COXE,
   EMILE KLOH.